US009834672B2

(12) United States Patent
Ness

(10) Patent No.: US 9,834,672 B2
(45) Date of Patent: Dec. 5, 2017

(54) IMPACT MODIFIED THERMOPLASTIC RESIN COMPOSITION

(75) Inventor: Jason Ness, East Norriton, PA (US)

(73) Assignee: Arkema Inc., King of Prussia, PA (US)

( * ) Notice: Subject to any disclaimer, the term of this patent is extended or adjusted under 35 U.S.C. 154(b) by 206 days.

(21) Appl. No.: 11/719,814

(22) PCT Filed: Nov. 2, 2005

(86) PCT No.: PCT/US2005/039454
§ 371 (c)(1),
(2), (4) Date: May 21, 2007

(87) PCT Pub. No.: WO2006/057777
PCT Pub. Date: Jun. 1, 2006

(65) Prior Publication Data
US 2009/0149600 A1    Jun. 11, 2009

Related U.S. Application Data

(60) Provisional application No. 60/629,987, filed on Nov. 22, 2004.

(51) Int. Cl.
*C08L 67/00* (2006.01)
*C08L 69/00* (2006.01)
*C08L 51/04* (2006.01)

(52) U.S. Cl.
CPC ............... *C08L 67/00* (2013.01); *C08L 69/00* (2013.01); *C08L 51/04* (2013.01)

(58) Field of Classification Search
CPC ...... C08L 2666/24; C08L 51/04; C08L 67/00; C08L 69/00
USPC .................... 525/242, 67, 902, 310; 523/201
See application file for complete search history.

(56) References Cited

U.S. PATENT DOCUMENTS

| 4,034,013 A | * | 7/1977 | Lane ............................ 524/513 |
| 4,535,124 A | | 8/1985 | Binsack et al. |
| 4,912,163 A | | 3/1990 | Lausberg et al. |
| 4,929,672 A | | 5/1990 | Laughner |
| 4,929,673 A | | 5/1990 | Laughner et al. |
| 4,963,618 A | * | 10/1990 | Sasaki et al. ................... 525/67 |
| 5,008,330 A | | 4/1991 | Laughner |
| 5,068,285 A | | 12/1991 | Laughner |
| 5,189,091 A | | 2/1993 | Laughner |
| 5,367,021 A | | 11/1994 | Roovers et al. |
| 5,679,759 A | * | 10/1997 | Wittmann et al. ............ 528/196 |
| 5,969,041 A | | 10/1999 | Eichenauer et al. |
| 6,048,931 A | | 4/2000 | Fujita et al. |
| 6,403,683 B1 | | 6/2002 | Kobayashi |
| 6,407,167 B1 | * | 6/2002 | Shishido et al. ................. 525/67 |
| 6,417,239 B1 | * | 7/2002 | Murray et al. ................ 521/48.5 |
| 6,512,027 B2 | | 1/2003 | Kanai et al. |
| 6,512,077 B1 | * | 1/2003 | Miyamoto et al. ........... 528/196 |
| 6,809,151 B1 | | 10/2004 | Lacroix |
| 7,015,261 B1 | | 3/2006 | Zerafati |
| 7,119,152 B1 | | 10/2006 | Lacroix |
| 7,195,820 B2 | | 3/2007 | Hong |
| 7,314,893 B2 | | 1/2008 | Hong |
| 2002/0013410 A1 | * | 1/2002 | Mizuta et al. .................... 525/63 |
| 2003/0027926 A1 | * | 2/2003 | Miyamoto et al. ............... 525/70 |
| 2003/0092819 A1 | * | 5/2003 | Miyatake et al. ............. 524/457 |
| 2004/0192847 A1 | * | 9/2004 | Ajbani et al. .................. 525/191 |
| 2009/0306246 A1 | | 12/2009 | Gervat |

FOREIGN PATENT DOCUMENTS

| EP | 0 396 113 B1 | 11/1990 |
| JP | 2003-261758 | 9/2003 |
| WO | WO 90/10674 | 9/1990 |

OTHER PUBLICATIONS

Roberts et al. Journal of Polymer Science Part B: Polymer Physics, 2000, 38, 3136-3150.*
Counterpart Japanese—2008-520805 Office Action dated Jun. 30, 2011, (Translation).

* cited by examiner

*Primary Examiner* — Mark Kaucher
(74) *Attorney, Agent, or Firm* — Lynn B. Morreale

(57) ABSTRACT

This invention relates to a thermoplastic resin composition having excellent impact resistance and molded appearance. The thermoplastic resin is a polycarbonate, polyester-based resin or a blend of polycarbonate and a polyester-based resin containing up to 30 percent by weight of at least one core-shell impact modifier having little or no styrene in the core.

11 Claims, No Drawings

IMPACT MODIFIED THERMOPLASTIC RESIN COMPOSITION

This application claims benefit, under U.S.C. §119 or §365 of PCT application PCT/US2005/039454 filed Nov. 2, 2005 and U.S. Provisional application No. U.S. 60/629,987, filed Nov. 22, 2004.

FIELD OF THE INVENTION

This invention relates to a thermoplastic resin composition having excellent impact resistance and molded appearance. The thermoplastic resin is a polycarbonate, polyester-based resin or a blend of polycarbonate and a polyester-based resin, containing up to 30 percent by weight of at least one core-shell impact modifier having little or no styrene in the core.

BACKGROUND OF THE INVENTION

Polycarbonate and polyester resins have found many commercial uses. Blends of polycarbonate and polyester-based polymers capitalize on the strengths of each polymer and have been found to exhibit excellent physical properties such as rigidity, hardness, scuff resistance, and stability under dynamic and thermal stress. They are also easy to process. A deficiency with these resins is their mechanical properties, especially impact resistance.

Attempts have been made to improve the physical properties through the addition of core-shell impact modifiers. U.S. Pat. No. 4,535,124 discloses the use of a core-shell impact having a bimodal diene or allyl acrylate rubber core. U.S. Pat. No. 5,367,021 discloses a graft copolymer diene rubber core with an optional shell, having particle sizes between 200 and 300 nm. U.S. Pat. No. 5,969,041 discloses a composition having two different core-shell polymer particles, each with a styrene acrylonitrile shell.

A core-shell emulsion polymer having a butadiene-based core and a particle size of from 100 to 200 nm is disclosed in U.S. Pat. No. 6,407,167. All examples of core polymers contained 15-20 percent styrene.

Dispersibility of the core-shell impact modifier combined with the impact resistance, and especially low temperature impact resistance, of the modified polycarbonate/polyester-based resin blends, has not been addressed in the art.

Surprisingly, it has been found that impact resistance of the modifier/polycarbonate/polyester-based resin composition and impact modifier dispersibility is significantly improved when the level of styrene in the core of the core-shell impact modifier is reduced or eliminated.

SUMMARY OF THE INVENTION

An objective of the invention is to improve the impact resistance of a polycarbonate, polyester-based resin, or a blend thereof.

Another objective of the invention is to improve the dispersibility of a core-shell impact modifier having a butadiene core in a polycarbonate, polyester-based resin or a blend thereof.

The objects of the invention are met by a thermoplastic resin composition comprising:
a) 70 to 99 percent by weight of a thermoplastic resin selected from the group comprising a polycarbonate, a polyester, and blends thereof; and
b) 1 to 30 percent by weight of a core-shell graft copolymer comprising:
1) 70 to 90 percent by weight of a core polymer comprising from 95 to 100 percent by weight of butadiene monomer units; and
2) 10 to 30 percent by weight of one or more shell polymer layers comprising one or more ethylenically unsaturated monomer units.

DETAILED DESCRIPTION OF THE INVENTION

The invention relates to a thermoplastic resin that is a polycarbonate, polyester-based resin, or a mixture thereof with a butadiene-based core-shell impact modifier.

The thermoplastic resin of the invention is a polycarbonate, a polyester-based resin, or a blend thereof. Preferably the resin is a blend of from 5 to 95% by weight of a polycarbonate resin, and 5 to 95% by weight of a saturated polyester resin and/or polyester-based elastomer. More preferably the thermoplastic resin is a blend of from 25 to 75% by weight of a polycarbonate resin, and 25 to 75% by weight of a saturated polyester resin and/or polyester-based elastomer.

A polycarbonate resin can be an aromatic polycarbonate resin, and can be a polycarbonate produced using a dihydroxydiphenyl alkane as the main raw material. For example, polycarbonates obtained by a transesterification method or phosgene method using 2,2-(4,4'-dihydroxydiphenyl)propane (bisphenol A) as a dihydroxy component are preferable. Further, part or all of the above-mentioned bisphenol A may be substituted with other 4,4'-dihydroxydiphenyl alkane or 4,4'-dihydroxydiphenylsulfone, 4,4'-dihydroxydiphenyl ether and the like, and two or more of them may also be mixed and used.

The saturated polyester resin is a resin obtained by a condensation reaction using an aromatic dicarboxylic acid or ester-forming derivative thereof and alkylene glycol as the main components. Examples of the aromatic dicarboxylic acid include, but are not limited to, terephthalic acid, isophthalic acid, and naphthalenedicarboxylic acid. Examples of the allylene glycol include, but are not limited to, ethylene glycol, propylene glycol, tetramethylene glycol, and hexamethylene glycol. Additionally, other dicarboxylic acids and glycols may also be copolymerized in small amounts, if desired. Preferred saturated polyester resins include polytetramethylene terephthalate, polyethylene terephthalate and a mixture thereof.

A polyester-based elastomer, of the present invention is a block copolymer having a polyester segment having high melting point and a polymer segment having low melting point. The polyester segment having a high melting point is a polyester obtained by a condensation reaction of an aromatic dicarboxylic acid with an alkylene glycol. Examples of the aromatic dicarboxylic acid include, but are not limited to, terephthalic acid, isophthalic acid, and naphthalene dicarboxylic acid. Examples of the alkylene glycol include, but are not limited to, ethylene glycol, propylene glycol, tetramethylene glycol, and hexamethylene. In addition to these, other dicarboxylic acids and glycols may also be copolymerized in small amount, as desired. Preferred polyesters include polytetramethylene terephthalate, polyethylene terephthalate, and mixtures thereof.

The polymer segment having a low melting point is composed of a polymer having a molecular weight from 400 to 20000 such as a polyalkylene ether glycol, aliphatic polyester and the like. Examples of the polyalkylene ether glycol include poly(ethylene oxide) glycol, poly(tetramethylene oxide) glycol, poly(propylene oxide) glycol and a mixture thereof. Examples of the aliphatic polyester include polyesters obtained from an aliphatic dicarboxylic acid having 2 to 12 carbon atoms and an aliphatic glycol having 2 to 10 carbon atoms. Examples of the preferable polymer segment having a low melting point include polyethylene adipate, polytetramethylene adipate, polyethylene sebacate, polyneopentyl sebacate, polyhexamethylene azelate, poly-ϵ-caprolactone and the like. The proportion of these polymer segments having low melting point in the polyester-based elastomer is preferably from 2 to 80% by weight.

The core-shell impact modifier is an emulsion graft copolymer having a butadiene-based core polymer and one or more shell polymers. A graft copolymer, is obtained by graft-polymerizing a monomer or monomer mixture containing at least an aromatic vinyl, alkyl methacrylate or alkyl acrylate in the presence of a latex containing a butadiene-based rubber polymer.

The butadiene-based rubber polymer is made by emulsion polymerization of from 90 to 100 percent by weight of 1,3 butadiene monomer and 0 to 10 percent by weight of one or more vinyl-based monomers copolymerized with 1,3-butadiene. Examples of the vinyl-based monomer include, but are not limited to aromatic vinyls such as styrene, and alpha-methylstyrene. In a preferred embodiment no vinyl-based monomers are copolymerized in the core. If styrene is used in the core, the level of styrene will be less than 5 percent. In a preferred embodiment, no styrene monomer is used in polymerizing the core. It was found that decreasing or elimination of styrene from the core improved the impact modification provided by the core-shell impact modifier when used in a thermoplastic resin.

Cross-linking monomers may also be included in the core polymer. Cross-linking monomers useful in the present invention include, but are not limited to aromatic polyfunctional vinyl compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di and tri-allyl compounds such as diallyl phthalate, diallyl sebacate, and triallyltriazine.

In a preferred embodiment, no cross-linking monomer units are in the core polymer.

Chain transfer agents are also useful in forming the core polymer. Useful chain transfer agents include those known in the art, including but not limited to t-dodecylmercaptan, n-octylmercaptan, and mixtures of chain transfer agents. The chain transfer agent is used at levels from 0 to 2 percent by weight, based on the total core monomer content. In a preferred embodiment, 0.2 to 1 percent chain transfer agent is used in forming the core polymer.

The core polymer of the present invention makes up from 70 to 90 percent by weight of the core-shell graft polymer. The shell polymer makes up from 10 to 30 percent by weight of the core-shell graft polymer.

The butadiene-based rubber polymer is made by emulsion polymerization. The polymerization can be carried out at from 40° C. to 80° C. depending on the kind of a polymerization initiator. As the emulsifier, known emulsifiers can be used. Before initiation of the polymerization, seed latex may be charged. A semi-batch polymerization is preferable. By semi-batch is meant that part of monomers used in the polymerization are initially charged into the reaction system, and after initiation of the polymerization, the remaining monomers are added in a continuous manner over a period of time. The monomers and other adjuncts may be added as separate feeds, or mixed together and the mixture added over time. By adopting such as a polymerization method, excellent polymerization stability is obtained, and latex having desired particle size and particle size distribution can be obtained stably.

The butadiene-based rubber polymer of the invention has a weight-average particle size of from 120 to 200 nm, and preferably from 140 to 190 nm. The ratio of the weight-average particle size to the number-average particle size is from 1 to 3, preferably 1 to 2.

The graft copolymer impact modifier is obtained by grafting a monomer or monomer mixture to the butadiene-based rubber polymer latex to form a core-shell particle. Monomers useful in forming the shell polymer include aromatic vinyls such as styrene, alpha-methylstyrene and various halogen-substituted and alkyl-substituted styrene; alkyl methacrylates such as methyl methacrylate, and ethyl methacryalte; alkyl acrylates such as ethyl acrylate and n-butyl acrylate; unsaturated nitrites such as acrylonitrile and methacrylonitrile; vinyl-based monomers having a glycidyl group such as glycidyl acrylate, glycidyl methacryalte, allyl glycidyl ether, and ethylene glycol glycidyl ether. These monomer can be used alone or in combination of two or more. In one preferred embodiment the shell contains from 90-100 percent by weight of alkyl(meth)acrylate monomer units. A shell of 100 percent methyl methacrylate, or of 95-100 percent methacrylate and 0-5 percent ethyl acrylate is especially preferred.

Cross-linking monomers at from 0 to 6 percent by weight may be used to form the shell polymer. Preferably a cross-linker is present in the shell at from 0.5 to 2.5 percent. Cross-linking monomers useful in the shell include, but are not limited to aromatic polyfunctional vinyl compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di and tri-allyl compounds such as diallyl phthalate, diallyl sebacate, and triallyltriazine.

Polymerization initiators useful in producing a graft copolymer include, but are not limited to a persulfate salt such as potassium persulfate, ammonium persulfate, and sodium persulfate; an organic peroxide such as t-butyl hydroperoxide, cumene hydroperoxide, benzoyl peroxide, lauroyl peroxide, p-menthane hydroperoxide, and diisopropylbenzene hydroperoxide; an azo compound such as azobisisobutyronitrile, and azobisisovaleronitrile; or a redox initiator.

As the graft polymerization method, an emulsion polymerization method is used. The polymerization can occur at temperatures in the range from 40 to 80° C., depending on the polymerization initiator. As the emulsifier, known emulsifiers can appropriately be used. Preferably the grafting is done by adding the shell monomers continuously. The shell may be formed as a single shell, or in the form of a multiple shell. A single shell is preferred, as the process is simpler and less time consuming.

The thermoplastic resin composition of the present invention may be produced by various methods such as a method in which powders or granules are mixed by a known technology, including but not limited to, a Henschel mixer, or tumbler; the mixture is melt-mixed by an extruder, kneader, or mixer; a method in which into previously melted components, other components are mixed sequentially; and a method in which a mixture is molded directly by an injection molding machine, and the like.

To a thermoplastic resin composition of the present invention, stabilizers against heat or light, for example, phenol-based stabilizers, phosphite-based stabilizers, ultraviolet absorbers, amine-based stabilizers may be added. Further, anti-hydrolysis modifiers, for example, epoxy-based modifiers may also be added. Further, known flame retardants and fillers such as titanium oxide, talc and the like, dyes and pigments, plasticizers and the like can be added, if necessary.

The thermoplastic resin composition of the present invention is useful in many applications, including as automatic parts. In the case of automatic parts use, particularly excellent appearance is necessary, and the glossiness is desirably at 80% or more.

The preferred embodiments of our invention will be exemplified by the following examples. One skilled in the art will realize that minor variations outside the embodiments stated herein do not depart from the spirit and scope of this invention. "Parts" and "%" in examples and comparative examples indicate "parts by weight" and "% by weight", respectively.

EXAMPLES

Example 1 Polymerization of Butadiene Rubber Polymer Latex ($R_1$)

To a 1-gallon high-pressure reactor was charged: de-ionized water, emulsifier, 1,3-butadiene, t-dodecyl mercaptan, and p-menthane hydroperoxide as an initial kettle charge, as outlined below. The solution was heated, with agitation, to 43° C. at which time a redox-based catalyst solution was charged, effectively initiating the polymerization. Then the solution was further heated to 56° C. and held at this temperature for a period of three hours.

Three hours after polymerization initiation, a second monomer charge, one-half of an additional emulsifier and reductant charge, and additional initiator were continuously added over eight hours. Following the completion of the second monomer addition, the remaining emulsifier and reductant charge plus initiator was continuously added over an additional five hours.

Thirteen hours after polymerization initiation, the solution was heated to 68° C. and allowed to react until at least twenty hours had elapsed since polymerization initiation, producing butadiene rubber latex, $R_1$.

| Butadiene Rubber Latex, $R_1$ | |
| --- | --- |
| Kettle Charge | |
| de-ionized water | 116.5 parts |
| beef tallow fatty acid, potassium salt | 0.1 parts |
| 1,3-butadiene | 21.9 parts |
| t-dodecyl mercaptan | 0.1 parts |
| Initiator | |
| p-menthane hydroperoxide | 0.1 parts |
| Redox-based Catalyst | |
| de-ionized water | 4.5 parts |
| sodium tetrapyrophosphate | 0.3 parts |
| ferrous sulfate | 0.004 parts |
| dextrose | 0.3 parts |
| Second Monomer | |
| 1,3-butadiene | 77.8 parts |
| t-dodecyl mercaptan | 0.2 parts |
| Emulsifier & Reductant | |
| de-ionized water | 30.4 parts |
| beef tallow fatty acid, potassium salt | 2.8 parts |
| dextrose | 0.5 parts |
| Initiator | |
| p-menthane hydroperoxide | 0.8 parts |

The resultant butadiene rubber latex ($R_1$) contained 38% solids and had a particle size, $d_w$, of ≈160 nm and a $d_w/d_n$ of 1.1.

Example 2 Polymerization of Butadiene Rubber Polymer Latex ($R_2$)

Using the rubber latex polymerization procedure outline in Example 1, the following composition was utilized to produce butadiene rubber latex, $R_2$.

| Butadiene Rubber Latex, $R_2$ | |
| --- | --- |
| Kettle Charge | |
| de-ionized water | 116.5 parts |
| beef tallow fatty acid, potassium salt | 0.1 parts |
| 1,3-butadiene | 21.9 parts |
| t-dodecyl mercaptan | 0.1 parts |
| Initiator | |
| p-menthane hydroperoxide | 0.1 parts |
| Redox-based Catalyst | |
| de-ionized water | 4.5 parts |
| sodium tetrapyrophosphate | 0.3 parts |
| ferrous sulfate | 0.004 parts |
| dextrose | 0.3 parts |
| Second Monomer | |
| 1,3-butadiene | 77.8 parts |
| t-dodecyl mercaptan | 0.5 parts |
| Emulsifier & Reductant | |
| de-ionized water | 30.4 parts |
| beef tallow fatty acid, potassium salt | 2.8 parts |
| dextrose | 0.5 parts |
| Initiator | |
| p-menthane hydroperoxide | 0.8 parts |

The resultant butadiene rubber latex ($R_2$) contained 38% solids and had a particle size, $d_w$, of ≈170 nm and a $d_w/d_n$ of 1.1.

Example 3 Polymerization of Butadiene-Based Rubber Polymer Latex ($R_3$)

Using the rubber latex polymerization procedure outline in Example 1, the following composition was utilized to produce butadiene-based rubber latex, $R_3$.

| Butadiene-based Rubber Latex, $R_3$ | |
|---|---|
| Kettle Charge | |
| de-ionized water | 116.5 parts |
| beef tallow fatty acid, potassium salt | 0.1 parts |
| 1,3-butadiene | 20.8 parts |
| styrene | 1.1 parts |
| t-dodecyl mercaptan | 0.1 parts |
| Initiator | |
| p-menthane hydroperoxide | 0.1 parts |
| Redox-based Catalyst | |
| de-ionized water | 4.5 parts |
| sodium tetrapyrophosphate | 0.3 parts |
| ferrous sulfate | 0.004 parts |
| dextrose | 0.3 parts |
| Second Monomer | |
| 1,3-butadiene | 77.7 parts |
| styrene | 3.9 parts |
| t-dodecyl mercaptan | 0.5 parts |
| Emulsifier & Reductant | |
| de-ionized water | 30.4 parts |
| beef tallow fatty acid, potassium salt | 2.8 parts |
| dextrose | 0.5 parts |
| Initiator | |
| p-menthane hydroperoxide | 0.8 parts |

The resultant butadiene rubber latex ($R_3$) contained 38% solids and had a particle size, $d_w$, of ≈160 nm and a $d_w/d_n$ of 1.1.

Example 4 Polymerization of Butadiene Rubber Latex ($R_4$)

Using the rubber latex polymerization procedure outline in Example 1, the following composition was utilized to produce butadiene-based rubber latex, $R_4$.

| Butadiene Rubber Latex, $R_4$ | |
|---|---|
| Kettle Charge | |
| de-ionized water | 116.5 parts |
| potassium laurate | 0.1 parts |
| 1,3-butadiene | 21.9 parts |
| t-dodecyl mercaptan | 0.1 parts |
| Initiator | |
| p-menthane hydroperoxide | 0.1 parts |
| Redox-based Catalyst | |
| de-ionized water | 4.5 parts |
| sodium tetrapyrophosphate | 0.3 parts |
| ferrous sulfate | 0.004 parts |
| dextrose | 0.3 parts |
| Second Monomer | |
| 1,3-butadiene | 77.8 parts |
| t-dodecyl mercaptan | 0.2 parts |
| Emulsifier & Reductant | |
| de-ionized water | 30.4 parts |
| potassium laurate | 2.8 parts |
| dextrose | 0.5 parts |
| Initiator | |
| p-menthane hydroperoxide | 0.8 parts |

Example 5 Polymerization of Graft Copolymer ($G_1$)

Into a 5 Liter glass reactor was charged 75.0 parts, on a solids basis, of butadiene rubber latex $R_1$, $R_2$, $R_3$, or $R_4$, 37.6 parts de-ionized water, and 0.1 parts sodium formaldehyde sulfoxylate, as outlined in the composition below. The solution was agitated, purged with nitrogen, and heated to 77° C. When the solution reached 77° C., a mixture of 25.0 parts monomer(s) and 0.1 parts t-butyl hydroperoxide initiator was continuously added over 70 minutes, followed by a hold period of 80 minutes. Thirty minutes after the onset of the hold period, 0.1 parts of sodium formaldehyde sulfoxylate and 0.1 parts t-butyl hydroperoxide were added to the reactor at once.

| Graft Copolymer, $G_1$ | |
|---|---|
| Kettle Charge | |
| butadiene rubber latex (as solids) | 75.0 parts |
| de-ionized water | 37.6 parts |
| sodium formaldehyde sulfoxylate | 0.2 parts |
| Monomer Charge | |
| methyl methacrylate | 25.0 parts |
| ethyl acrylate | 0.0 parts |
| divinyl benzene | 0.0 parts |
| Initiator | |
| t-butyl hydroperoxide | 0.2 parts |

Following the 80-minute hold period, a stabilization emulsion was added to the graft copolymer latex. The stabilization emulsion was prepared by mixing 5.4 parts de-ionized water (based on graft copolymer mass), 0.1 parts oleic acid, 0.02 parts potassium hydroxide, 0.1 parts diluaryl thiodipropionate, and 0.24 parts triethyleneglycol-bis[3-(3-t-butyl-4-hydroxy-5-methylphenyl)-propionate].

The graft copolymer latex was added to a 0.9% aqueous sulfuric acid solution resulting in a coagulated material that was heat treated at 85° C., to further solidify. Subsequently, the coagulated material was filtered, washed with warm de-ionized water, and dried to produce a graft copolymer, $G_1$.

Example 6 Polymerization of Graft Copolymer ($G_2$)

Using the same graft copolymer polymerization procedure outline in Example 5, the following composition was utilized to produce graft copolymer $G_2$.

| Graft Copolymer, $G_2$ | |
|---|---|
| Kettle Charge | |
| butadiene rubber latex (as solids) | 75.0 parts |
| de-ionized water | 37.6 parts |
| sodium formaldehyde sulfoxylate | 0.2 parts |
| Monomer Charge | |
| methyl methacrylate | 24.7 parts |
| ethyl acrylate | 0.0 parts |
| divinyl benzene | 0.3 parts |
| Initiator | |
| t-butyl hydroperoxide | 0.2 parts |

Example 7 Polymerization of Graft Copolymer (G₃)

Using the same graft copolymer polymerization procedure outline in Example 5, the following composition was utilized to produce graft copolymer $G_3$.

| Graft Copolymer, $G_3$ | |
|---|---|
| Kettle Charge | |
| butadiene rubber latex (as solids) | 75.0 parts |
| de-ionized water | 37.6 parts |
| sodium formaldehyde sulfoxylate | 0.2 parts |
| Monomer Charge | |
| methyl methacrylate | 22.6 parts |
| ethyl acrylate | 1.1 parts |
| divinyl benzene | 1.4 parts |
| Initiator | |
| t-butyl hydroperoxide | 0.2 parts |

Example 8 Polymerization of Graft Copolymer (G₄)

Using rubber $R_4$ only and the graft copolymer polymerization procedure outline in Example 5, the following composition was utilized to produce graft copolymer $G_4$.

| Graft Copolymer, $G_4$ | |
|---|---|
| Kettle Charge | |
| butadiene rubber latex (as solids) | 75.0 parts |
| de-ionized water | 37.6 parts |
| sodium formaldehyde sulfoxylate | 0.2 parts |
| Monomer Charge | |
| methyl methacrylate | 21.3 parts |
| styrene | 3.5 parts |
| divinyl benzene | 0.3 parts |
| Initiator | |
| t-butyl hydroperoxide | 0.2 parts |

Compounding and Testing of Impact-Modified Thermoplastic

A blend of graft copolymer, polycarbonate, and/or polybutylene terephthalate were prepared by melt processing the blends in a 27 mm diameter co-rotating twin-screw extruder at 255° C. to form a pellet. The graft copolymer was loaded at 12% of the total weight of the blend. The remaining 70-98% of the blend is comprised of a polycarbonate/polybutylene terephthalate blend of about 50/50.

The pellets were subsequently injection molded into test specimens having dimensions in accordance with publish standards (ISO 180 and ASTM D-256). All samples were conditioned at 23° C. with 50% relative humidity for at least 48 hours prior to testing.

Impact testing was then performed using a pendulum-type impact tester operating within the specifications given in both the ISO 180 and ASTM D-256 standards. For all impact testing at temperatures below ambient temperature (23° C.), the samples were allowed to equilibrate to the desired temperature for at least 2 hours. After this time, the samples were tested immediately using a robotic impact tester that measured, placed, clamped, and tested each sample. During the testing, only one sample was removed from the conditioning chamber at a time. Impact values are reported as the average of at least 5 samples, preferably 10 samples.

Fracture type is reported as brittle for samples undergoing a complete break or hinge break at the specified temperature. Ductile fracture is reported for samples undergoing a partial break or non-break at the specified temperature. The brittle-ductile transition temperature (BDTT) is defined as the temperature at which 50% of the samples suffered brittle failure (i.e., a hinge or complete break).

Various physical properties in the following examples and comparative examples were measured by the following methods. Measurements to determine % solids were performed using a CEM SMART SYSTEM 5® moisture/solids analyzer. Weight-average particle size, $d_w$ and number-average particle size, $d_n$ were measured by a capillary-mode particle size distribution measuring apparatus.

Notched Izod impact measurements were made according to ISO 180/1A or ASTM D-256.

Example 9 Testing Results

Samples were formed with the compositions shown in the Table I below, with the BDTT results listed.

TABLE I

| | | Rubber Core | | | | |
|---|---|---|---|---|---|---|
| Example | % loading | Type | Particle size, nm | $d_w/d_n$ | Graft Type | BDTT ° C. |
| 9.1 | 12 | $R_1$ | 159 | 1.1 | $G_1$ | −18 |
| 9.2 | 12 | $R_2$ | 171 | 1.1 | $G_3$ | −16 |
| 9.3 (Comp) | 12 | $R_3$ | 162 | 1.1 | $G_1$ | −10 |
| 9.4 (Comp) | 12 | $R_3$ | 170 | 1.2 | $G_3$ | −5 |

The results in Table I show that BDTT values can be lowered ≈10° C. by reducing the level of styrene in the rubber core to zero. This significant decrease in BDTT is necessary for demanding molded parts applications where low temperature impact performance is paramount. In certain applications for example, the BDTT values shown in comparative examples 9.3 and 9.4 (−10 and −5° C., respectively) provide inadequate low temperature impact performance. The BDTT values shown in examples 9.1 and 9.2 (−18 and −16° C., respectively), however, are sufficient in providing acceptable low temperature impact performance in the same applications.

What is claimed is:

1. A thermoplastic resin composition comprising:
   (A) polymeric resin, wherein all polymeric resin in the thermoplastic resin composition consists of:
   a) 70 to 99 percent by weight of a thermoplastic resin selected from the group consisting of a polycarbonate, a polyester, and blends thereof having about 50 to 95 percent by weight polyester and about 5 to 50 percent by weight polycarbonate; and
   b) 1 to 30 percent by weight of one or more core-shell graft copolymer impact modifiers comprising:
   1) 70 to 90 percent by weight of a styrene-free core polymer comprising 100 percent by weight of butadiene monomer units, polymerized using 0.2 to 1 percent by weight of chain transfer agent; and
   2) 10 to 30 percent by weight of one or more shell polymer layers comprising one or more ethylenically unsaturated monomer units, 90 to 100 percent by weight of these units being alkyl(meth)

acrylate monomer units comprising from 95 to 100 percent by weight of methylmethacrylate, wherein said core polymer has a weight-average particle size of from 120 to 200 nm and a ratio of weight-average particle size to number-average particle size from 1 to 3; and (B) optionally one or more additives selected from the group consisting of stabilizers, anti-hydrolysis modifiers, flame retardants, fillers, dyes, pigments, and plasticizers.

2. The thermoplastic resin of claim 1 wherein said shell polymer consists of a single shell layer.

3. The thermoplastic resin of claim 1 wherein said shell polymer comprises from 0 to 6 percent by weight of crosslinker monomer units.

4. The thermoplastic resin of claim 1 wherein said thermoplastic comprises 1 to 20 percent by weight of the core-shell graft copolymer.

5. A process for forming the thermoplastic resin composition of claim 1 comprising the steps of
a) forming a butadiene rubber latex by emulsion polymerization involving admixing a 1,3-butadiene monomer, initiator, surfactant and water to form a butadiene rubber particles latex having a weight average particle diameter of from 120-200 nm;
b) graft polymerizing one or more polymer shells onto said butadiene particles to form core-shell particles having
1) 70 to 90 percent by weight of a core polymer comprising from 100 percent by weight of butadiene monomer units; and
2) 10 to 30 percent by weight of one or more shell polymer layer comprising one or more ethylenically unsaturated monomer units,
c) blending from 1-30 weight percent of said core-shell particles with 70 to 99 weight percent of a thermoplastic resin selected from the group consisting of a polycarbonate, a polyester, and blends thereof having about 50 to 95 percent by weight polyester and about 5 to 50 percent by weight polycarbonate.

6. The process of claim 5, wherein a seed latex is charged to the admixture in step a) prior to polymerization.

7. The process of claim 6, wherein the seed latex is a butadiene seed latex comprising 90 to 100 weight percent of butadiene monomer units.

8. The process of claim 5, wherein the formation of the butadiene core polymer is by a semi-batch process.

9. The process of claim 5, wherein said emulsion polymerization is carried out at from 40° C. to 80° C.

10. The process of claim 7 wherein said seed polymer comprises 100 percent by weight of butadiene monomer units.

11. The process of claim 7 wherein said seed polymer further comprises from 0 to 2 percent by weight of a chain transfer agent and/or 0 to 2 percent by weight of a cross-linking monomer.

* * * * *